Figure 1:
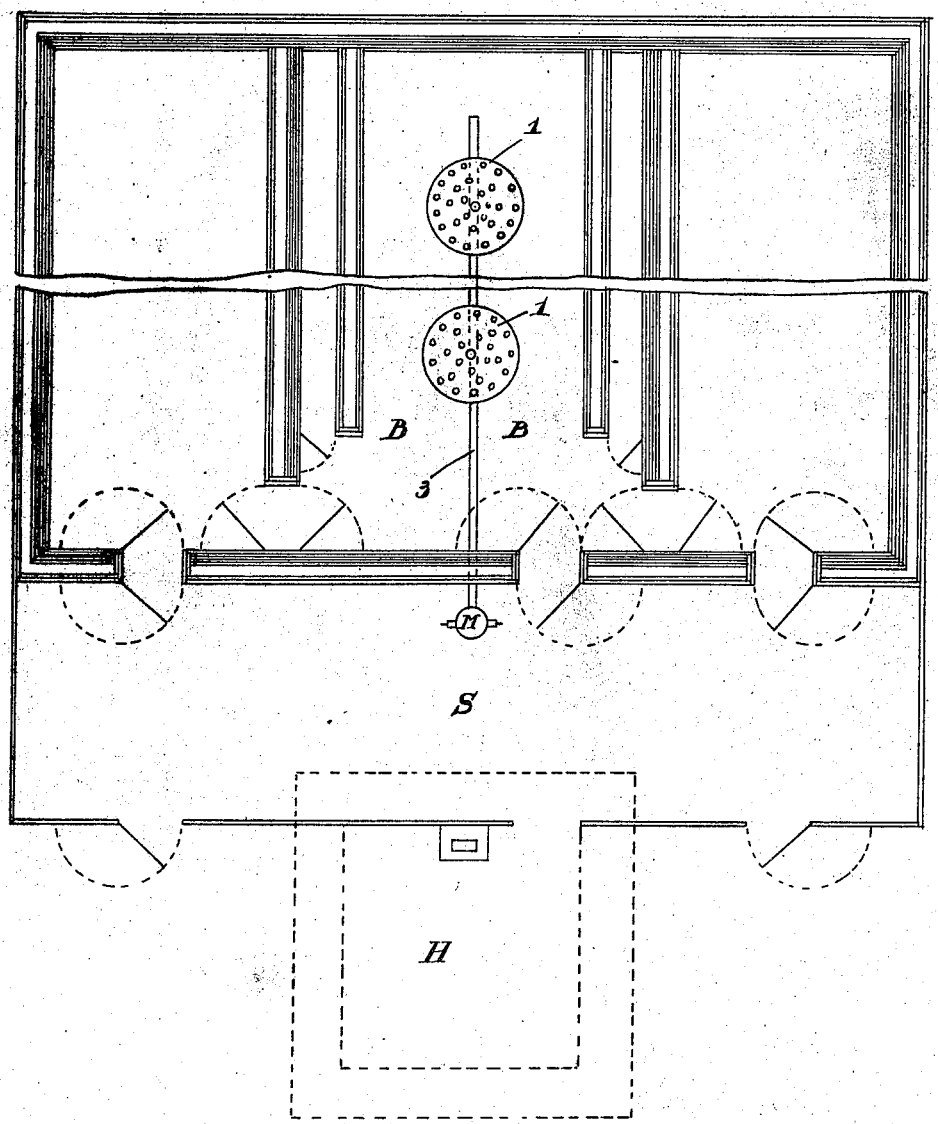

Inventor
Joseph T. Bertrand
By William C Linton
Attorney

Jan. 1, 1924 1,479,050
J. T. BERTRAND
APPARATUS FOR THE CURING AND DESICCATING OF FISH AND OTHER
PERISHABLE ARTICLES OF FOOD
Filed March 11, 1918   3 Sheets-Sheet 2

Inventor
Joseph T. Bertrand
By William C. Sinton
Attorney

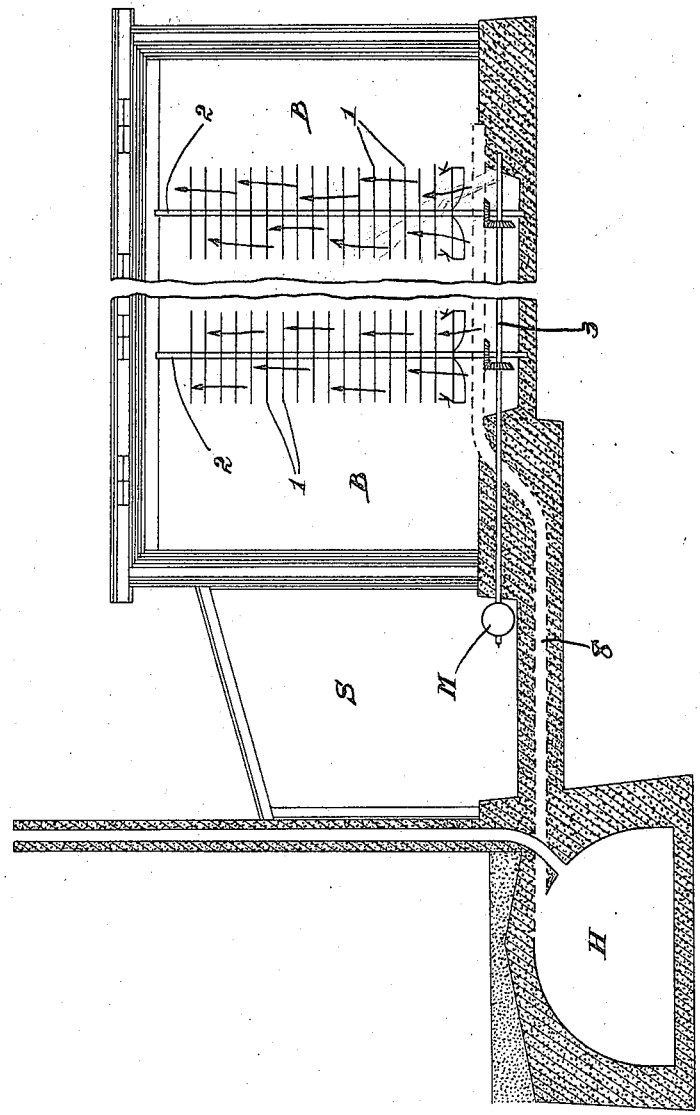

Patented Jan. 1, 1924.

1,479,050

UNITED STATES PATENT OFFICE.

JOSEPH TETU BERTRAND, OF ISLE-VERTE, QUEBEC, CANADA.

APPARATUS FOR THE CURING AND DESICCATING OF FISH AND OTHER PERISHABLE ARTICLES OF FOOD.

Application filed March 11, 1918. Serial No. 221,861.

*To all whom it may concern:*

Be it known that I, JOSEPH TETU BERTRAND, a subject of the King of Great Britain, residing at Isle-Verte, Province of Quebec, Canada, have invented certain new and useful Improvements in an Apparatus for the Curing and Desiccating of Fish and Other Perishable Articles of Food; and I do hereby declare that the following is a full, clear, and exact description of the invention, such as will enable others skilled in the art to which it appertains to make and use the same.

My invention relates to a system for the curing and desiccating of fish and other perishable foods.

The object of my invention is to provide a system to partly or thoroughly desiccate and cure fish or other foods by smoke or otherwise.

A more specific object is to provide a system less expensive, necessitating less hand labour, and more expeditive than the system now in use.

A further more specific object is to provide a system that will, in a very short time, rain or shine, and in any season, prepare for the needs of the market, a better, cheaper and more wholesome produce than in the past.

A further still more specific object is to provide a system that will prevent waste and losses brought to-day in the curing of fish or other foods by the open air sun system or other systems, such as by smoking, through improper weather, excess of rain, fog or heat, improper sandy beach, lack of hand labour and improper handling through neglect or ignorance.

My invention consists of a system applied through the construction, combination and arrangement of parts as hereby illustrated, described and claimed.

In the accompanying drawings, forming part of this application I have one form of embodiment of my invention, in which drawings similar reference characters designate corresponding parts and in which:

Figure 1 is a horizontal section of the building B showing the floor plan of an installation of the system which consists of perforated revolving planes (1) around a vertical axis (2) connected with an horizontal axis (3) and surrounded by reservoirs (4) containing cooling agents and other purifying and drying elements through which the circulation of air is forced.

Figure 2:
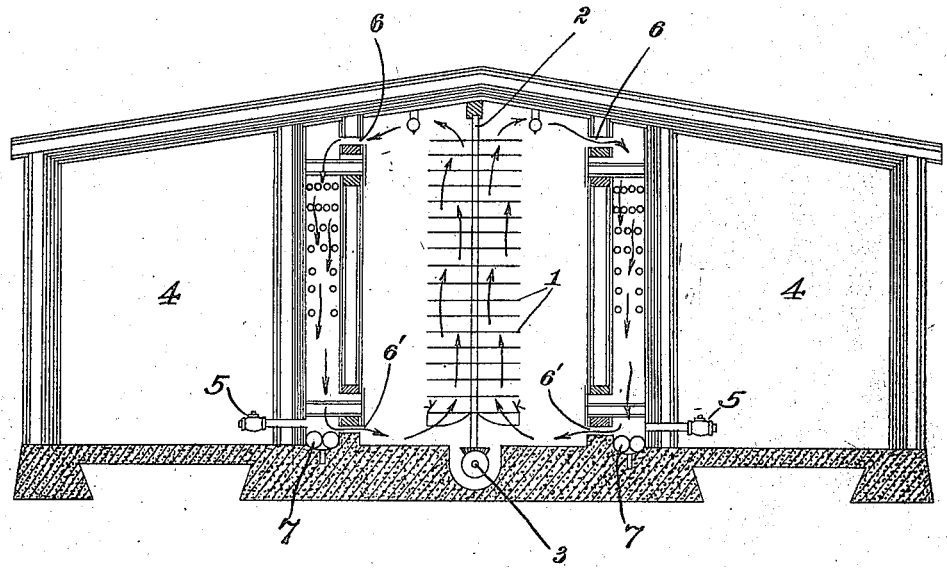

Figure 2 is a cross vertical section of the same building showing the set of perforated revolving planes (1) set horizontally and superposed around a vertical revolving axis (2) connected with horizontal axis (3) also reservoirs (4) with openings (6) at top through which the air is forced through purifying, drying elements and cooling agents before it comes back by openings (6') made at the bottom of said reservoirs to circulate once more through the perforated revolving planes until the moisture has partly or fully disappeared or until the fish has been otherwise cured leaving a thoroughly clean and wholesome product.

Figure 3 is a longitudinal vertical section of the same building showing the set of perforated revolving planes (1) with centripetal and centrifugal attachments set horizontally and superposed around a vertical revolving axis (2) connected with horizontal axis (3) also motor M in shed S and cellar H for the production of heat and when needed smoke to be cooled and purified on its way through pipes 8 leading to curing building B.

Proper drains are shown at 7. Referring to the drawings I designate a building B specially equipped for the curing and desiccating of fish, a shed (S) at one of the extremities to receive fish or other product with a small room for motor M when needed and a separate, when possible underground room H, to generate warm air or smoke when needed to be cooled in conduits on its way to revolving planes in building B.

This main building B may be made of any size to suit circumstances and quantity of produce to be cured or desiccated. Reservoirs to contain cooling agents and other purifying and drying elements will be built on the sides with openings at top and bottom. The foundation built on solid, well drained ground should be made of good concrete with an all concrete floor. Provisions will be taken for proper drainage, for the quick and complete cleaning and flushing of the whole place and also for the laying of the horizontal axis (3) and other parts of machinery to operate and keep in motion for time needed the vertical axis and sets of revolving planes (1) thereto attached.

When needed for accelerating the thorough desiccating of fish or other foods, warm air will be furnished at the bottom of series of revolving planes.

The revolving planes (1) will be perforated to allow throughout the free circulation of air.

Attachments to set and keep fish in proper position and to force the air towards the center and upwards by a centripetal attraction and outwards by a centrifugal force, towards the top reservoir openings, will be secured to the revolving planes.

A motor which may be a water wheel, a gasoline engine or electrical motor or any other suitable motor according to circumstances needs and requirements will connect with shafts (1 and 3) so as to set them in proper motion.

A strong system of lights will be used inside the building or the light of the sun through the roof.

The central room for curing and desiccating will be separated from side reservoirs by partitions with top and bottom openings (6—6') opposite set of revolving planes (1) properly built with two double sheathing of well dried boards, proper papers and space filled with shavings so as to insure even without the mechanical contrivances mentioned the circulation of the air warmed and charged with moisture by the upper apertures and of the cooled dried air by the lower apertures through gravity.

Contrivances (5) containing disinfectants and other drying and purifying elements will be placed along route followed by air in circulation together with cooling agents to condense the moisture and purify the air before its further distribution through and among the planes which may be removable in series or otherwise.

The walls of the building will be built with all the necessary means and care to isolate thoroughly the interior of the building from the exterior or sides cold storage rooms by using the two double sheathing with double thicknesses of proper paper, the space needed for shavings and the interior well oiled sheathing with space between it and main wall.

In the accompanying drawings has been shown a simple and preferred form of the invention, it being, however, understood that no limitation is necessarily made to the precise structural details herein exhibited but the right is hereby reserved to any changes, alterations or modifications to which recourse may be had that come within the scope of the system claimed without departing from the spirit of the invention or sacrificing the efficiency of the same.

Having thus fully described my invention what I claim as new and desire to secure by Letters Patent is:

1. The combination in an apparatus of the character described, of a fish receiving compartment, vertical shafts journaled therein, means for rotating said shafts, horizontal perforated trays carried by the shafts, means for directing smoke to the bottoms of said trays, and means for redirecting smoke from the uppermost of said trays downwardly to the bottoms of the trays for further use.

2. An apparatus of the character described comprising a chamber having opposite hollow walls, a vertical shaft mounted therein, means for rotating said shaft, perforated fish supporting trays carried by the shaft in perpendicular relation thereto, means for directing smoke to said trays, said hollow walls having openings formed at the top and bottom in communication with the interior of the chamber, whereby the smoke from the uppermost of said trays is directed downwardly to the bottoms of the trays for further use.

Signed at Isle-Verte this 4th day of February, 1918, in presence of two witnesses.

JOSEPH TETU BERTRAND.

Witnesses:
J. F. RICHARD,
J. E. BONOVENTURE.